US011992821B2

(12) United States Patent
Esson et al.

(10) Patent No.: US 11,992,821 B2
(45) Date of Patent: May 28, 2024

(54) AGGREGATE PROCESSING SYSTEMS, METHODS AND APPARATUS

(71) Applicant: Superior Industries, Inc., Morris, MN (US)

(72) Inventors: Matt Esson, Miramichi (CA); Luke Hogan, Miramichi (CA)

(73) Assignee: Superior Industries, Inc., Morris, MN (US)

( * ) Notice: Subject to any disclaimer, the term of this patent is extended or adjusted under 35 U.S.C. 154(b) by 363 days.

(21) Appl. No.: 17/026,762

(22) Filed: Sep. 21, 2020

(65) Prior Publication Data

US 2021/0086156 A1     Mar. 25, 2021

Related U.S. Application Data

(60) Provisional application No. 62/941,632, filed on Nov. 27, 2019, provisional application No. 62/902,760, filed on Sep. 19, 2019.

(51) Int. Cl.
| | |
|---|---|
| *B07B 1/00* | (2006.01) |
| *B01J 2/18* | (2006.01) |
| *B01J 19/00* | (2006.01) |
| *B07B 1/40* | (2006.01) |
| *C10G 33/06* | (2006.01) |

(52) U.S. Cl.
CPC ............. *B01J 2/18* (2013.01); *B01J 19/0093* (2013.01); *B07B 1/005* (2013.01); *B07B 1/40* (2013.01); *C10G 33/06* (2013.01)

(58) Field of Classification Search
CPC ..... B07B 1/005; B07B 2230/01; B03B 5/623; B03B 5/66; B03B 7/00; B03B 9/00; B03B 9/02; B01J 2/18; B01J 19/0093; C10G 33/06
See application file for complete search history.

(56) References Cited

U.S. PATENT DOCUMENTS

| | | | | |
|---|---|---|---|---|
| 3,916,130 A | * | 10/1975 | Cade ................... | H01H 35/2671 73/302 |
| 4,234,413 A | * | 11/1980 | Summers ............... | B01D 29/01 209/326 |
| 5,049,261 A | * | 9/1991 | Tapp ....................... | B03B 9/005 209/11 |
| 6,607,248 B1 | * | 8/2003 | Childress ............... | B03B 9/005 299/10 |

(Continued)

FOREIGN PATENT DOCUMENTS

| | | |
|---|---|---|
| CN | 206008237 U | 3/2017 |
| CN | 106890504 A | 6/2017 |

(Continued)

OTHER PUBLICATIONS

GB Search Report, Application No. GB2014850.8, dated Mar. 12, 2021, 4 pages.

(Continued)

*Primary Examiner* — Joseph C Rodriguez
(74) *Attorney, Agent, or Firm* — Todd R. Fronek; Larkin Hoffman Daly & Lindgren, Ltd.

(57) ABSTRACT

Aggregate material processing systems, methods, and apparatus are described. In some embodiments, one or more components have a transport configuration and an operational configuration.

19 Claims, 16 Drawing Sheets

(56) References Cited

U.S. PATENT DOCUMENTS

| | | | |
|---|---|---|---|
| 9,409,184 B1* | 8/2016 | Mickelson | B07B 1/005 |
| 10,399,881 B2* | 9/2019 | Donais | C02F 1/34 |
| 2003/0173266 A1* | 9/2003 | Watters | B03B 9/005 |
| | | | 209/258 |
| 2016/0101428 A1* | 4/2016 | Convery | B03B 5/48 |
| | | | 209/3 |
| 2018/0214889 A1 | 8/2018 | Convery | |
| 2019/0275532 A1 | 9/2019 | Grimm et al. | |

FOREIGN PATENT DOCUMENTS

| | | |
|---|---|---|
| DE | 19600897.2 C1 | 4/1997 |
| GB | 2552042 B | 8/2018 |
| GB | 2560517 B | 4/2019 |
| KR | 101907828 B | 10/2018 |

OTHER PUBLICATIONS

"Evowash—Compact Sand Washing Plant", Brochure, CDE Global, 2018, 13 pages.
"FM60C—Washing Systems Technical Specification", Brochure, Terex, 2012, 8 pages.
"Mobile Washing Plants", webpage, Dernaseer, https://webarchive.org/web/20160524085243/https://www.dernaseercom/products/mobile-washing-plant/, 2016, 2 pages.
"TCP150 Compact Sand Plant", Brochure, Trio and Wehr Minerals, 2014, 2 pages.
"Ultra Sand Plants", McLanahan, Brochure, May 2014, 4.
Great Britain Office Action in Great Britain Application No. GB2014850.8, dated Sep. 25, 2023, 5 pages.

* cited by examiner

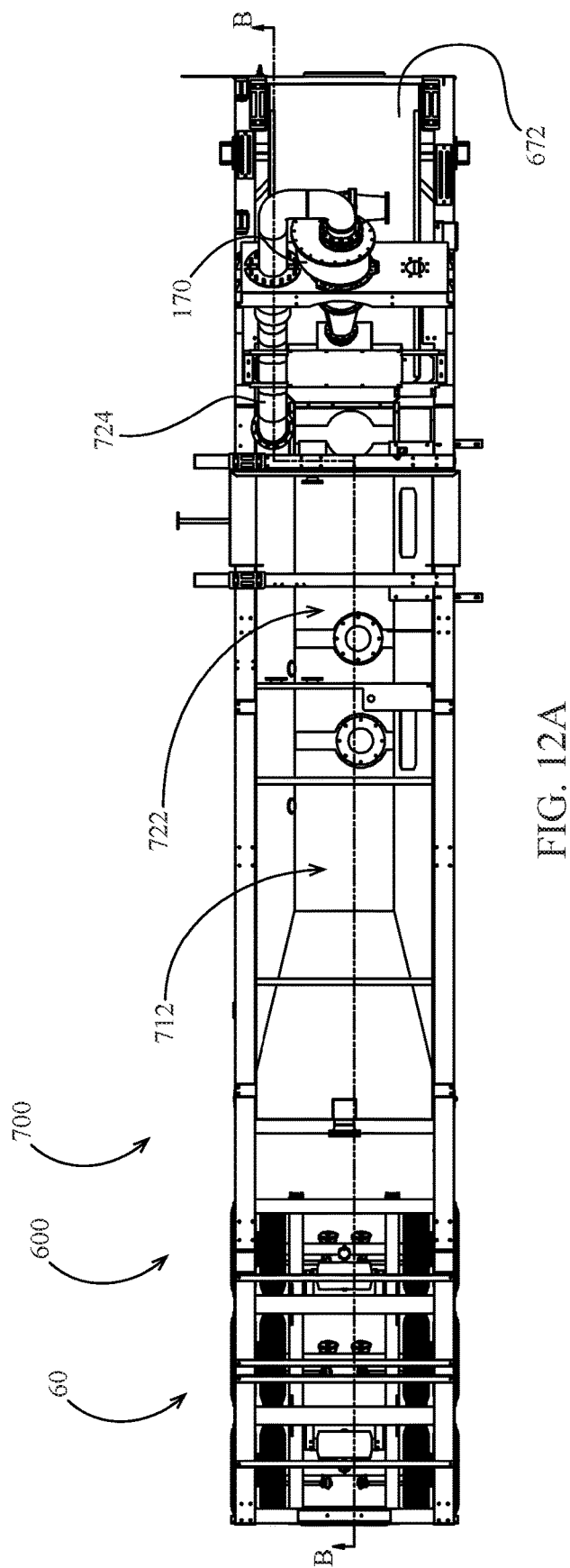
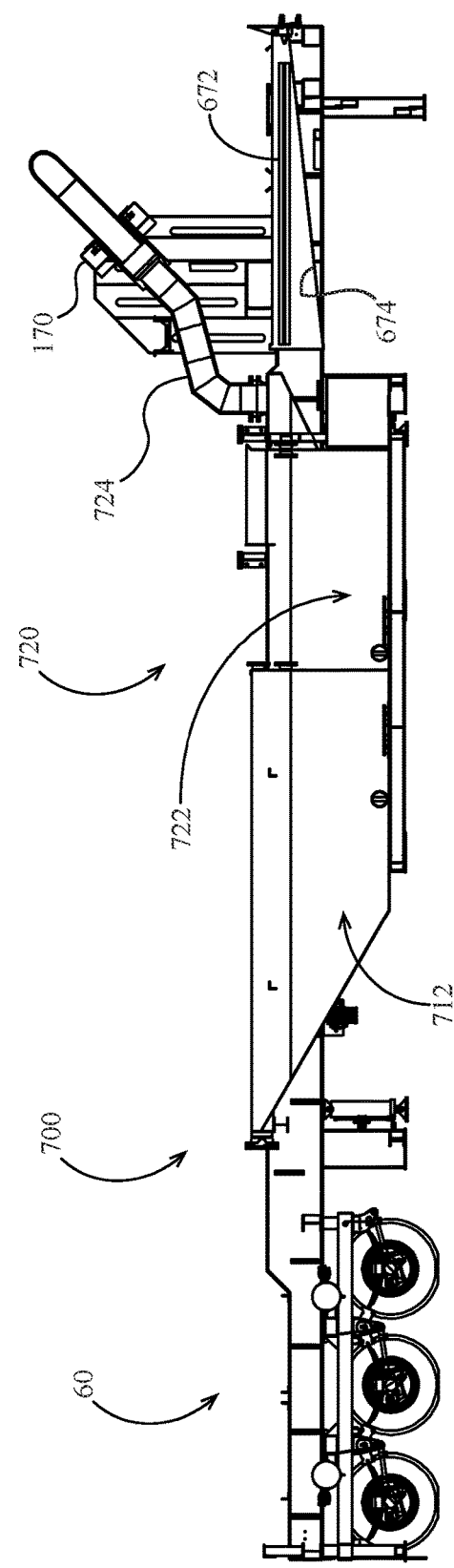
FIG. 12A
FIG. 12B

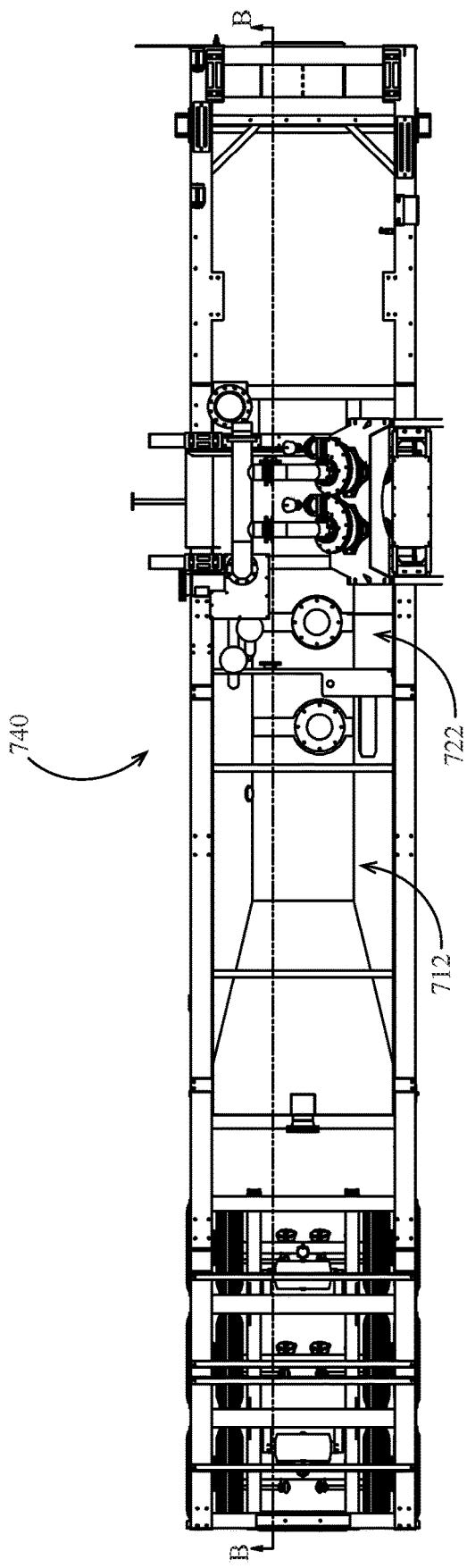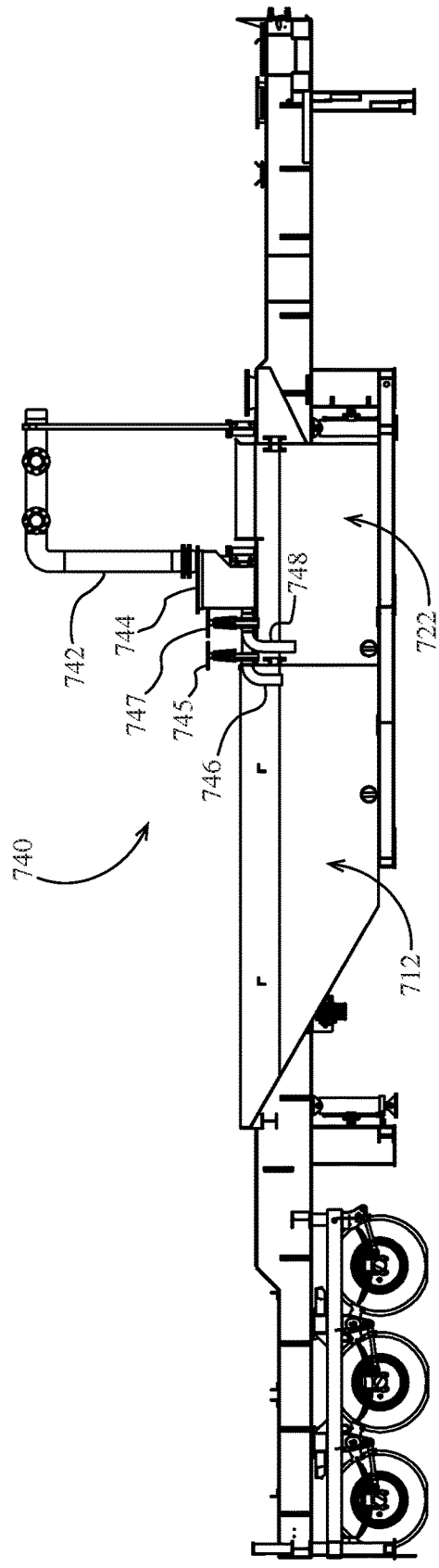
FIG. 14A
FIG. 14B

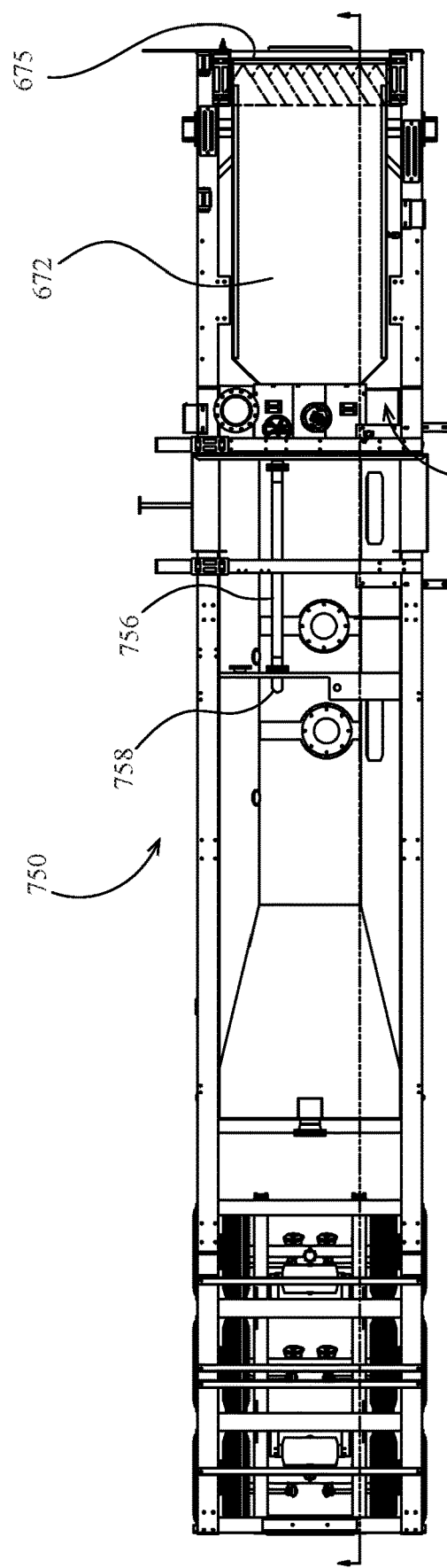
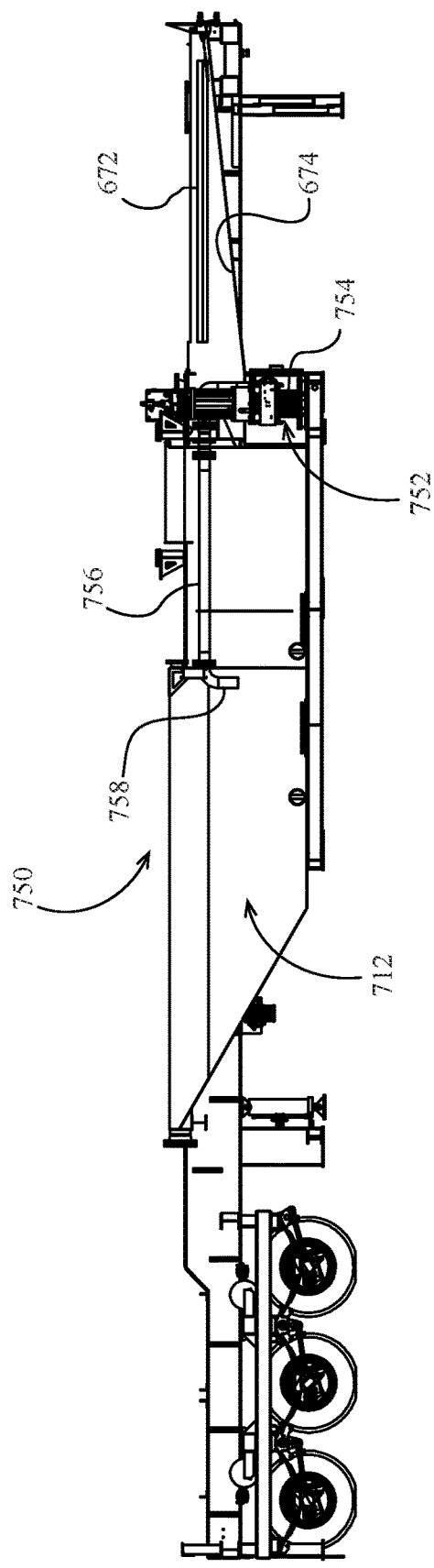
FIG. 15A
FIG. 15B

AGGREGATE PROCESSING SYSTEMS, METHODS AND APPARATUS

BACKGROUND

Aggregate processing plants such as washing and/or classifying plants and related equipment are used to remove fine material and/or contaminants from and/or to classify aggregate materials.

BRIEF DESCRIPTION OF THE DRAWINGS

FIG. 12A is another top view of the embodiment of the aggregate processing plant of FIG. 6 with certain components not shown.

FIG. 12B is a sectional view of the embodiment of the aggregate processing plant as viewed along section B-B of FIG. 12A with certain components not shown.

FIG. 14A is another top view of the embodiment of the aggregate processing plant of FIG. 6 with certain components not shown.

FIG. 14B is a sectional view of the embodiment of the aggregate processing plant as viewed along section B-B of FIG. 14A with certain components not shown.

FIG. 15A is another top view of the embodiment of the aggregate processing plant of FIG. 6 with certain components not shown.

FIG. 15B is a sectional view of the embodiment of the aggregate processing plant as viewed along section B-B of FIG. 15A with certain components not shown.

DESCRIPTION

Figure 1:
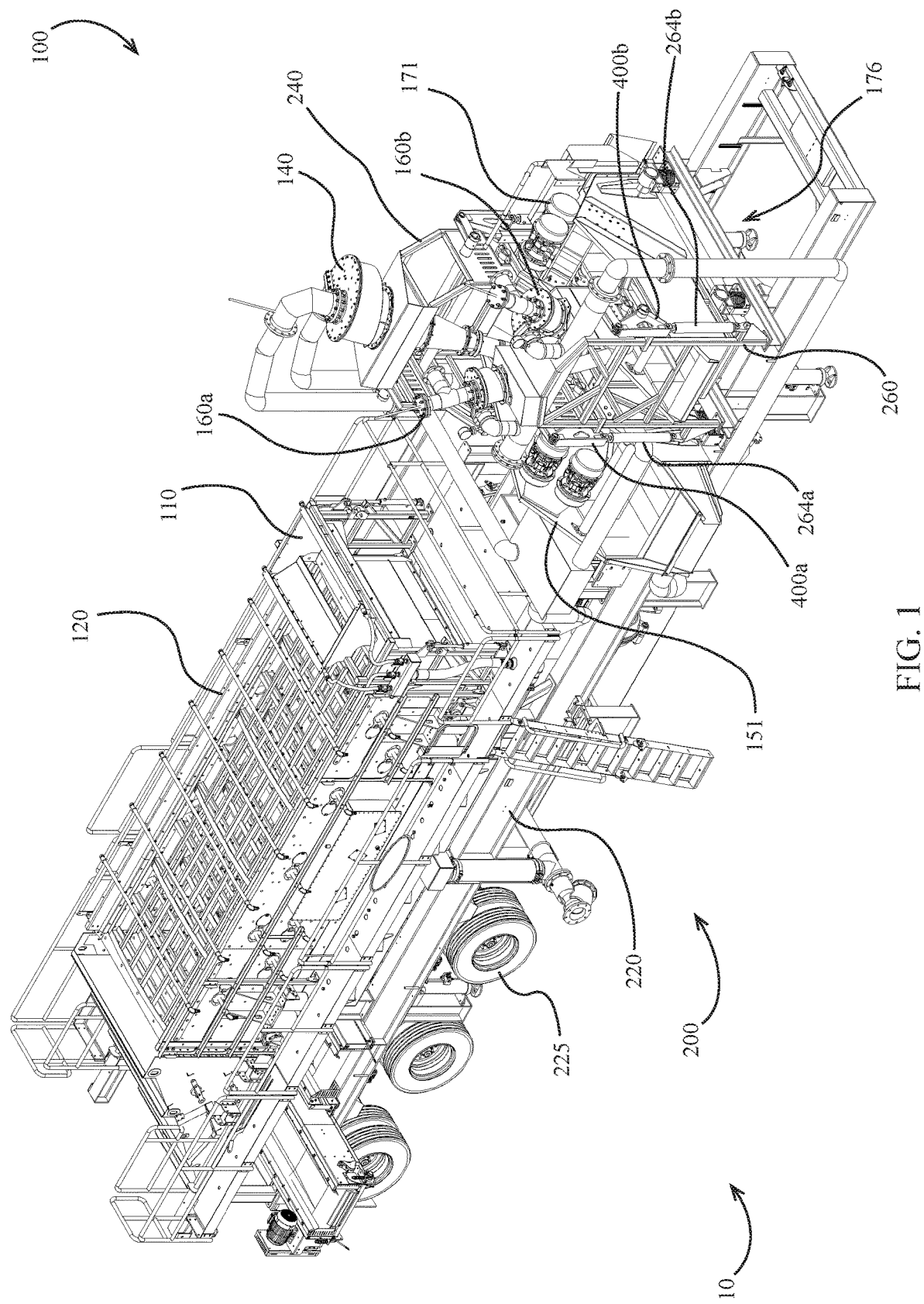
FIG. 1 is a perspective view of an embodiment of an aggregate processing plant in an operational configuration.
Figure 2:
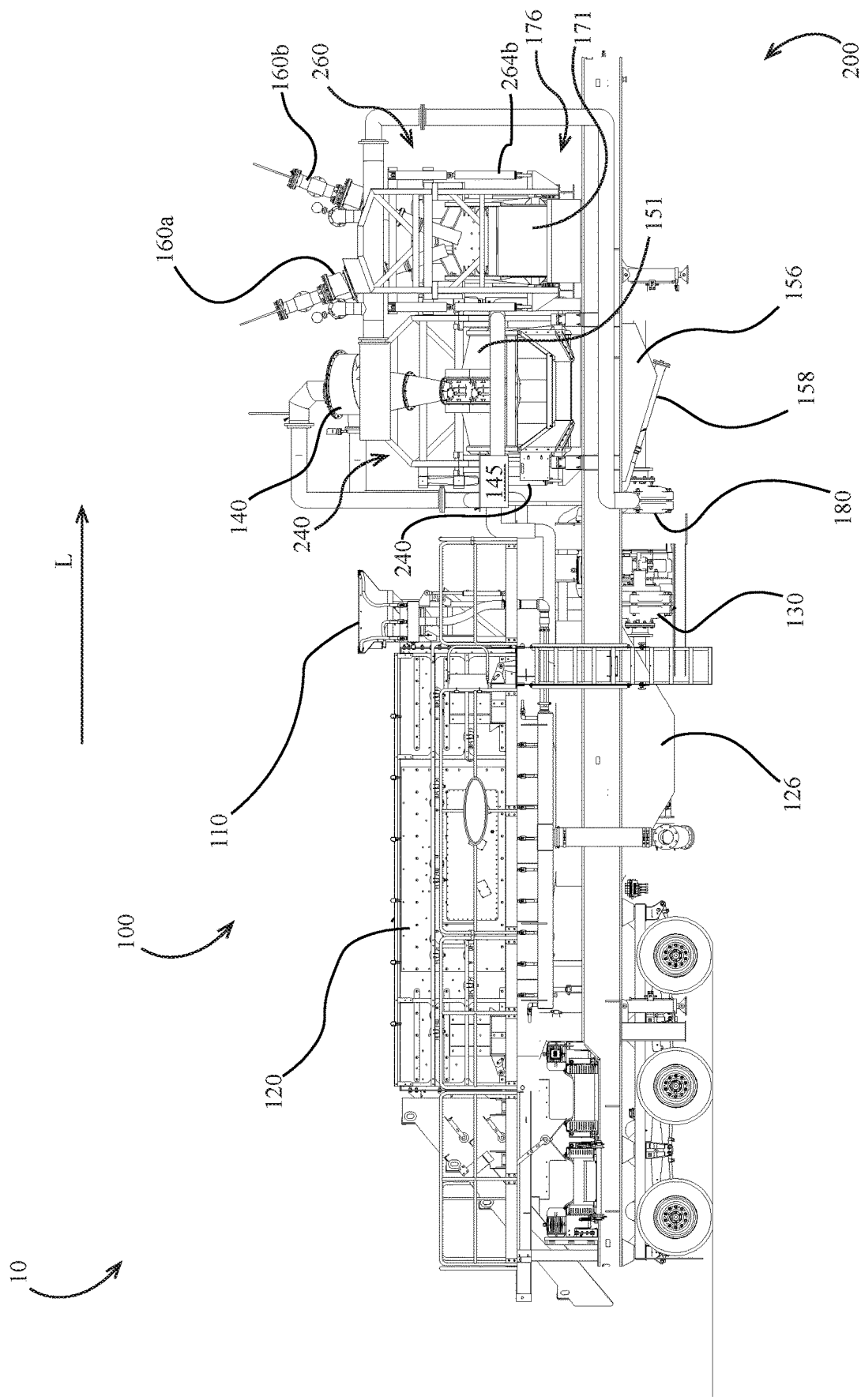
FIG. 2 is a side elevation view of the embodiment of the aggregate processing plant of FIG. 1.

Referring to the drawings, wherein like reference numerals designate identical or corresponding parts throughout the several views, FIGS. 1 and 2 illustrate an embodiment of a portable aggregate washing plant 10 in an operational configuration. The plant 10 optionally comprises a system 100 comprising a plurality of washing and/or classifying devices. The system 100 is optionally supported on a plant frame 200 including a base 220 which is optionally transportable on wheels 225 (or tracks, skids or other mobile or stationary supports). The plant 10 is optionally reconfigurable to a transport configuration (e.g., a configuration having a reduced overall dimension such as overall height) illustrated in FIGS. 3 and 4.

Referring to FIGS. 1-2, the system 100 optionally includes a classifying screen 120 such as a vibratory screen 120 (e.g., vibratory horizontal screen). A hopper 110 is optionally disposed to receive aggregate material (e.g., slurry) and transfer the aggregate material on the screen 120 (e.g., on an upper deck thereof). The system 100 optionally includes a sump 126 which is optionally disposed to receive output material (e.g., undersized material) from the screen 120. The system 100 optionally includes a pump 130 in fluid communication with the sump 126 and configured to pump and/or elevate material from sump 126. The system 100 optionally includes a hydrocyclone 140. In some embodiments, the pump 130 is fluidly coupled to an inlet (e.g., inlet head) of the hydrocyclone 140. The system 100 optionally includes a vibratory screen 151 (e.g., dewatering screen) which is optionally disposed to receive material from an outlet (e.g., underflow outlet) of the hydrocyclone 140. A sump 156 is optionally disposed to receive output material (e.g., undersize material) from the screen. The system 100 optionally includes at least one jet 158 (or pump or other material transfer device or structure) disposed to transfer material from sump 156 to the sump 126.

The system 100 optionally includes a splitter 145 (e.g., splitter box) coupled to and/or disposed to receive material from an outlet (e.g., overflow outlet) of the hydrocyclone 140. The splitter 145 is optionally configured to distribute a first overflow portion of hydrocyclone 140 to the sump 126. The splitter 145 is optionally configured to distribute a second overflow portion of hydrocyclone 140 to a sump 176 of the system 100. The second overflow portion is optionally larger (e.g., more than two times larger, more than three times larger, more than four times larger, more than five times larger, etc.) than the first overflow portion.

The system 100 optionally includes a pump 180 optionally configured to pump and/or elevate material from the sump 176. The pump 180 is optionally fluidly coupled to the inlet of one or more hydrocyclones 160 (e.g., two hydrocyclones 160a, 160b). The hydrocyclones 160a, 160b are optionally smaller in diameter than the hydrocyclone 140. A central axis of hydrocyclone 160a is optionally disposed at a first angle with respect to a transverse vertical plane. A central axis of hydrocyclone 160b is optionally disposed at a second angle with respect to a transverse vertical plane. The first and second angles are optionally opposing angles and in some embodiments may be equal or approximately equal opposing angles. A central axis of hydrocyclone 140 is optionally disposed at an angle with respect to a longitudinal vertical plane.

The system 100 optionally includes a vibratory screen 171 (e.g., dewatering screen) disposed to receive outlet material (e.g., underflow material) from one or more of the hydrocyclones 160. The sump 176 is optionally disposed to receive outlet material (e.g., undersize material) from the screen 171.

Figure 3:
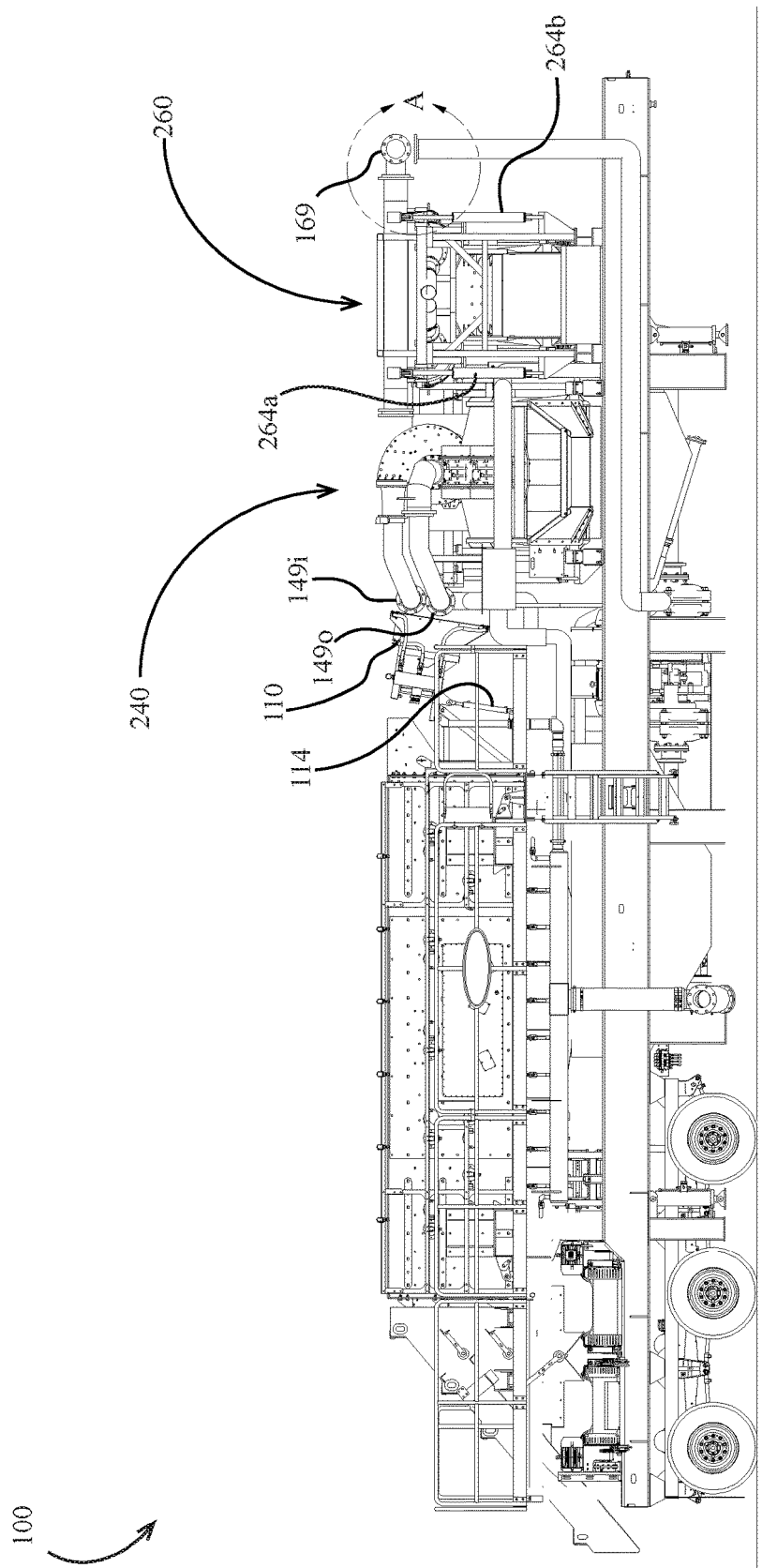
FIG. 3 is a side elevation view of the embodiment of the aggregate processing plant of FIG. 1 in a transport configuration.

The system 100 optionally includes a frame 240 which is optionally supported (e.g., directly or indirectly) on the plant frame 200 (e.g., the base 220 thereof) or other structure. The hydrocyclone 140 is optionally supported on (e.g., mounted to) the frame 240. The frame 240 (or a portion thereof) is optionally pivotable between an operational position (e.g., a generally vertical position) and a transport position (e.g., an angled or generally horizontal position). An exemplary operational position of frame 240 is shown in FIG. 2. An exemplary transport position of frame 240 is shown in FIG. 3. The frame 240 optionally pivots about a pivot axis which is optionally generally horizontal and optionally extends generally parallel to a longitudinal direction L. It should be appreciated that in some embodiments the overall height of the frame 240 is lower in the transport position than in the operational position.

The system 100 optionally includes a frame 260 which is optionally supported (e.g., directly or indirectly) on the plant frame 200 (e.g., the base 220 thereof) or other structure. The hydrocyclones 160 are optionally supported on (e.g., mounted to) the frame 260. The frame 260 (or a portion thereof) is optionally pivotable between an operational position (e.g., a generally vertical position) and a transport position (e.g., an angled or generally horizontal position). An exemplary operational position of frame 260 is shown in FIG. 2. An exemplary transport position of frame 260 is shown in FIG. 3. The frame 260 optionally pivots about a pivot axis which is optionally generally horizontal and optionally extends generally parallel to a longitudinal direction L. It should be appreciated that in some embodiments the overall height of the frame 260 is lower in the transport position than in the operational position.

Figure 4:
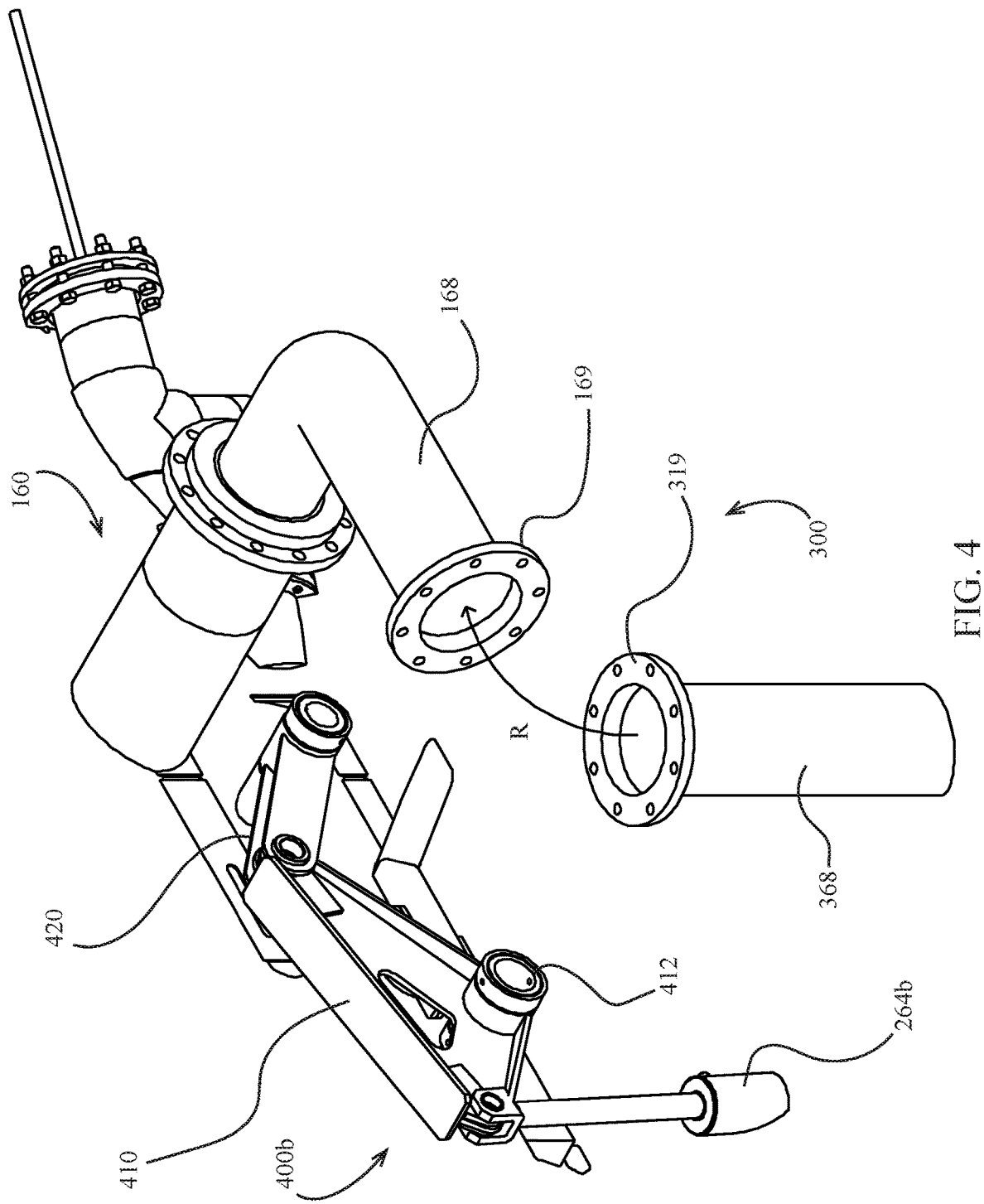
FIG. 4 is an enlarged view of the detail area A of FIG. 3.

Referring to FIG. 4, in some embodiments a conduit 168 (e.g., inlet or outlet conduit, etc.) rotates along a direction R as the hydrocyclones 160 pivot (e.g., with frame 260) from the operational position to the transport position. In some embodiments, the conduit 168 is fluidly coupled to one or both of the hydrocyclones 160. In some embodiments, a conduit 368 is fluidly coupled to the conduit 168 in the operational position. In some embodiments, the conduit 168 is decoupled from the conduit 368 before pivoting of the hydrocyclone. In some embodiments, the conduit 168 and conduit 368 are releasably coupled such as by a flange connection 300 which may comprise a first flange 319 of the conduit 368 and a second flange 169 of the conduit 168. In some embodiments the flange connection 300 (or other releasable coupling) is releasably coupled in the operational configuration by fasteners such as bolts and/or clamps. Referring to FIG. 3, in some embodiments, one or more conduits of the hydrocyclone 140 are also releasably fluidly coupled to one or more stationary conduits such as by flanges (e.g., 149*o*, 149*i*).

In some alternative embodiments, one or more conduits (e.g., 168, 149) are optionally coupled to stationary conduits (e.g., conduits that do not pivot when pivoting the associated hydrocyclones) by a flexible fluid coupling (e.g., rubber coupling, etc.) such that the conduits are allowed to move between the operation and transport positions without decoupling.

In some embodiments, the frame 260 is pivoted between the operational and transport positions by one or more actuators 264 (e.g., one or more hydraulic cylinders). In some embodiments, the frame 240 is pivoted between the operational and transport positions by one or more actuators 244.

In some embodiments, the frame 240 and/or frame 260 are raised and lowered (e.g., generally along a vertical direction) by one or more actuators between operational (raised) and transport (lowered) positions.

Referring again to FIG. 4, the frame 260 is optionally coupled to the plant frame 200 by one or more pivot assemblies 400 (or in alternative embodiments by a single pivot connection). In some embodiments, the pivot assembly 400 includes a link 410 (e.g., a generally triangular link) pivotally coupled to a pivot connection 412. The actuator 264 is optionally pivotally coupled to the link 410. The link 410 is further optionally pivotally coupled to a second link 420 (e.g., at a first end of link 420). The link 420 is optionally pivotally coupled to the frame 260. In some embodiments, the frame 240 is optionally similarly pivotally coupled by one or more links for pivoting between operational and transport positions.

In some embodiments, the hopper 110 is pivotally coupled to the screen 120 and/or to a frame or other structure supported on the plant frame 200. The hopper 110 is optionally pivotable from the operational position shown in FIG. 2 to the transport position shown in FIG. 3. The height of the hopper 110 in the transport position is optionally lower than in the operational position. In some embodiments, one or more actuators 114 (e.g., hydraulic cylinders) are used to pivot the hopper 110 between the operational and transport positions.

In some embodiments, the system 100 has an operational configuration (e.g., that shown in FIG. 2) and a transport configuration (e.g., that shown in FIG. 3) in which the hydrocyclones and associated frames are in the transport positions and/or the hopper 110 is in the transport position.

Figure 5:
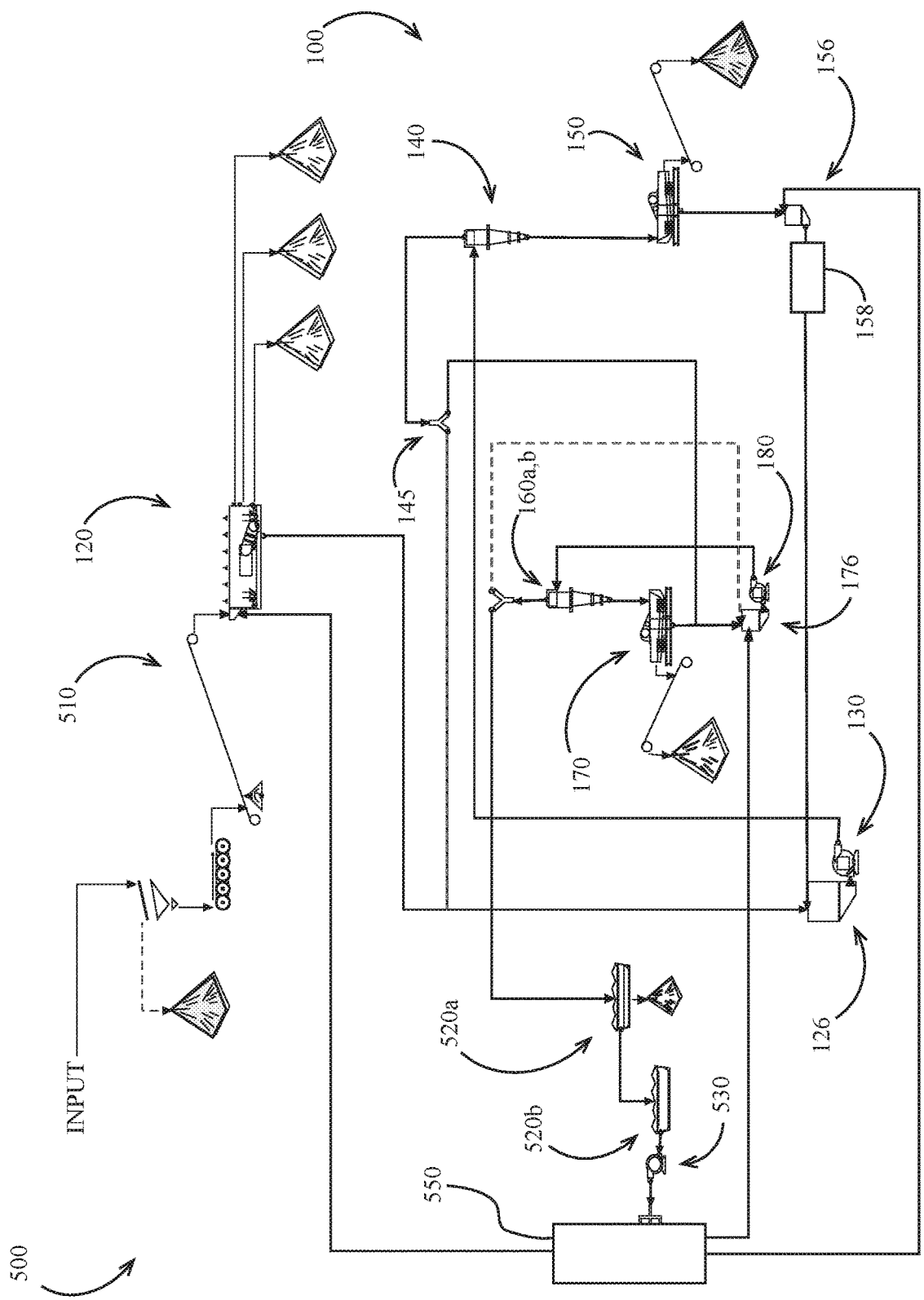
FIG. 5 is a schematic illustration of an embodiment of an aggregate processing system.

Referring to FIG. 5, an embodiment of an aggregate processing system 500 is schematically illustrated. The input material (e.g., slurry) is optionally conveyed (e.g., after being processed by one or more classifying or washing apparatus) by a conveyor 510 (or other transfer device) to the system 100, which is illustrated schematically in FIG. 5. One or more outputs of the system 100 (e.g., at least a portion of the overflow of one or more hydrocyclones 160) is transferred to one or more settling ponds 520 or other storage location. A pump 530 optionally pumps material from a settling pond 520 back to one or more inputs of the system 100 (e.g., via a manifold 550).

Referring to FIGS. 6-10, an embodiment of a portable aggregate washing plant 60 is illustrated. The plant 60 optionally comprises a system 600 comprising a plurality of washing and/or classifying devices. The system 600 is optionally supported on a plant frame 200 including a base 220 which is optionally transportable on wheels 225 (or tracks, skids or other mobile or stationary supports). The plant 60 optionally has a maximum height (and/or or other dimension such as width or travel-direction length) permitting road transport (e.g., less than 16 feet, less than 15 feet, less than 14 feet, etc.); it should be appreciated in light of the disclosure that the height or other dimension of the plant 60 permits road transport without reconfiguration and/or disassembly, e.g., in some embodiments the plant 60 has road-transportable dimensions (e.g., height, length and/or width) in its operating configuration.

Figure 6:
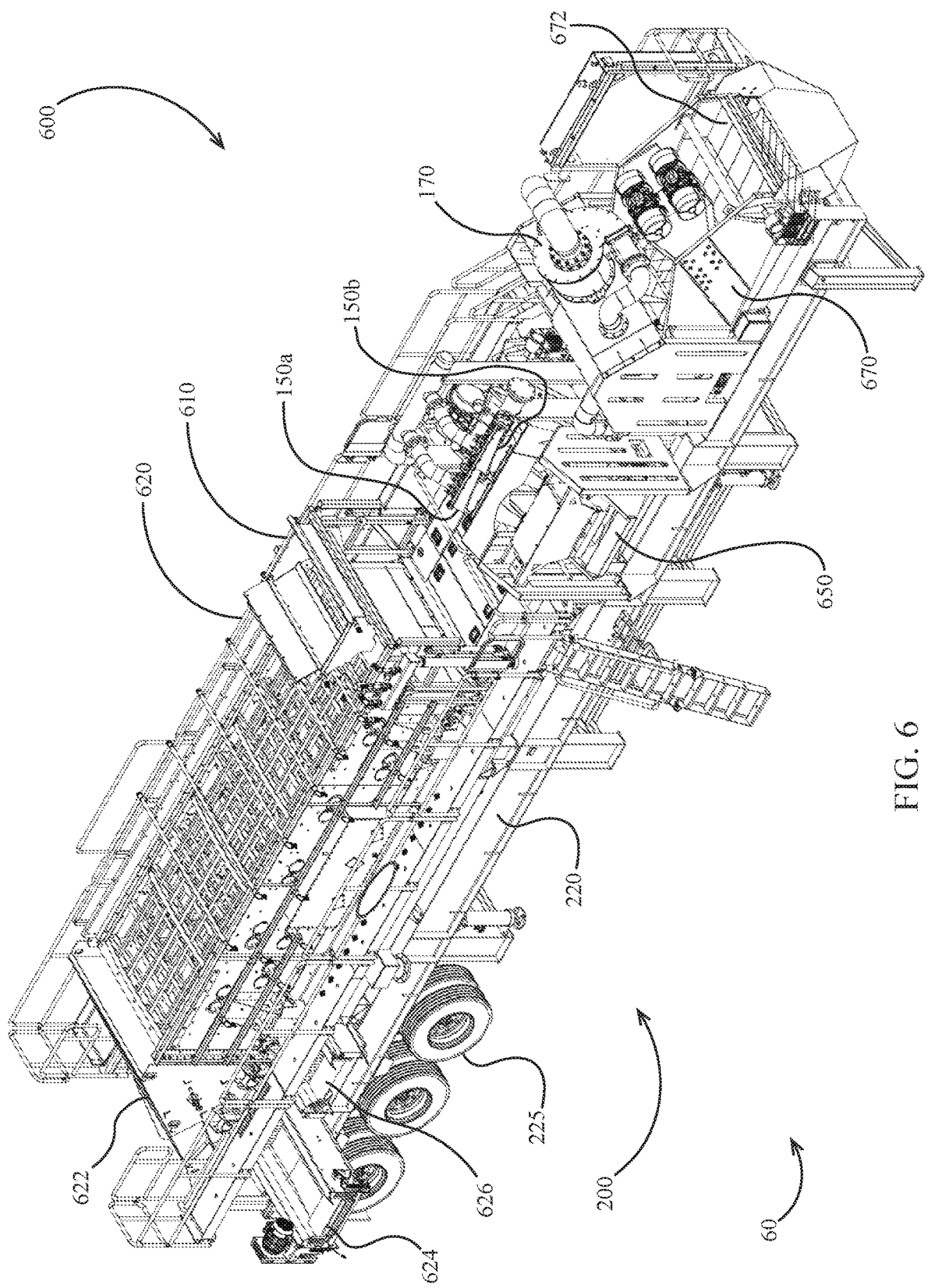
FIG. 6 is a perspective view of another embodiment of an aggregate processing plant.
Figure 7:
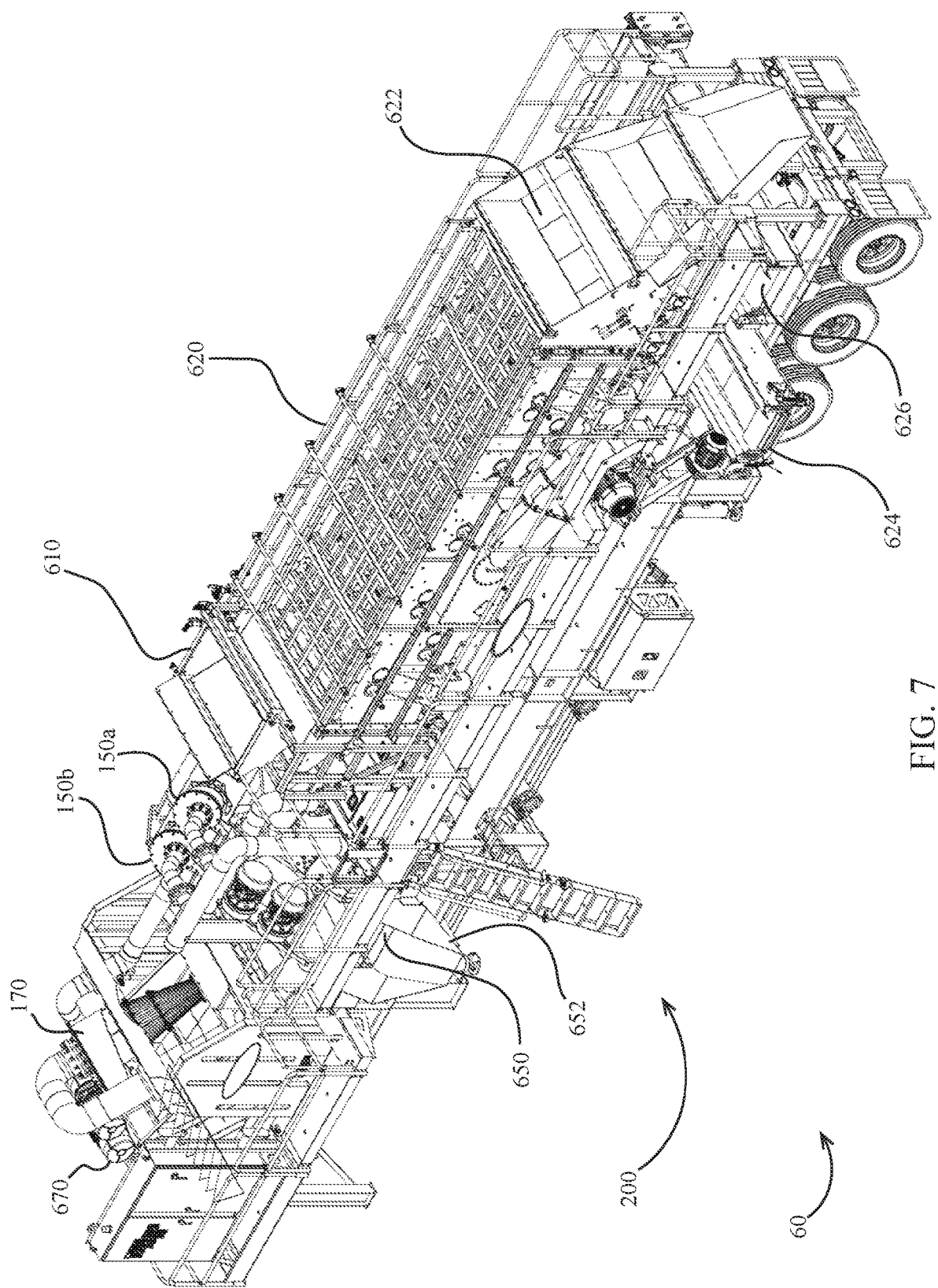
FIG. 7 is another perspective view of the embodiment of the aggregate processing plant of FIG. 6.
Figure 8:
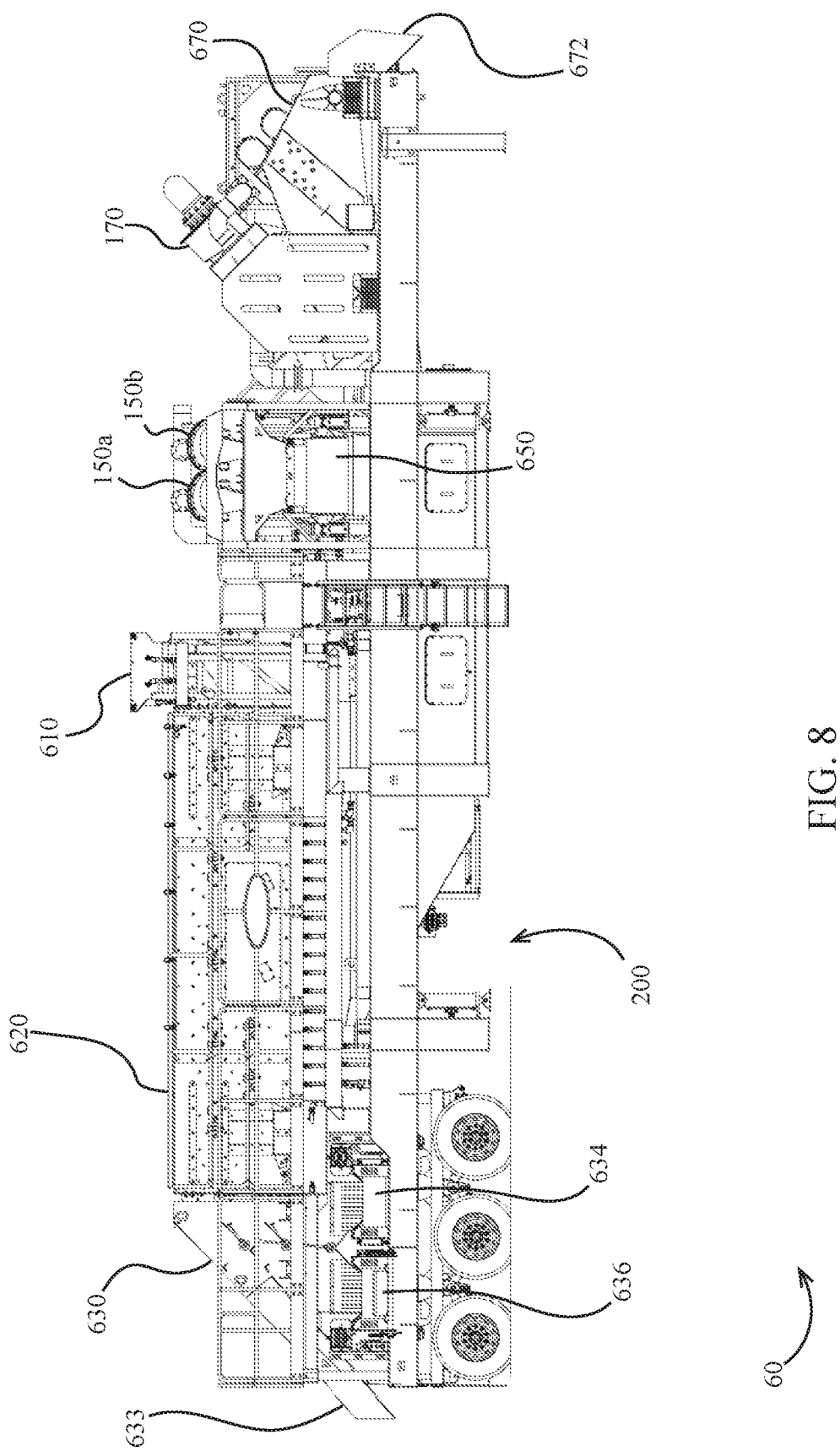
FIG. 8 is a right side elevation view of the embodiment of the aggregate processing plant of FIG. 6.
Figure 9:
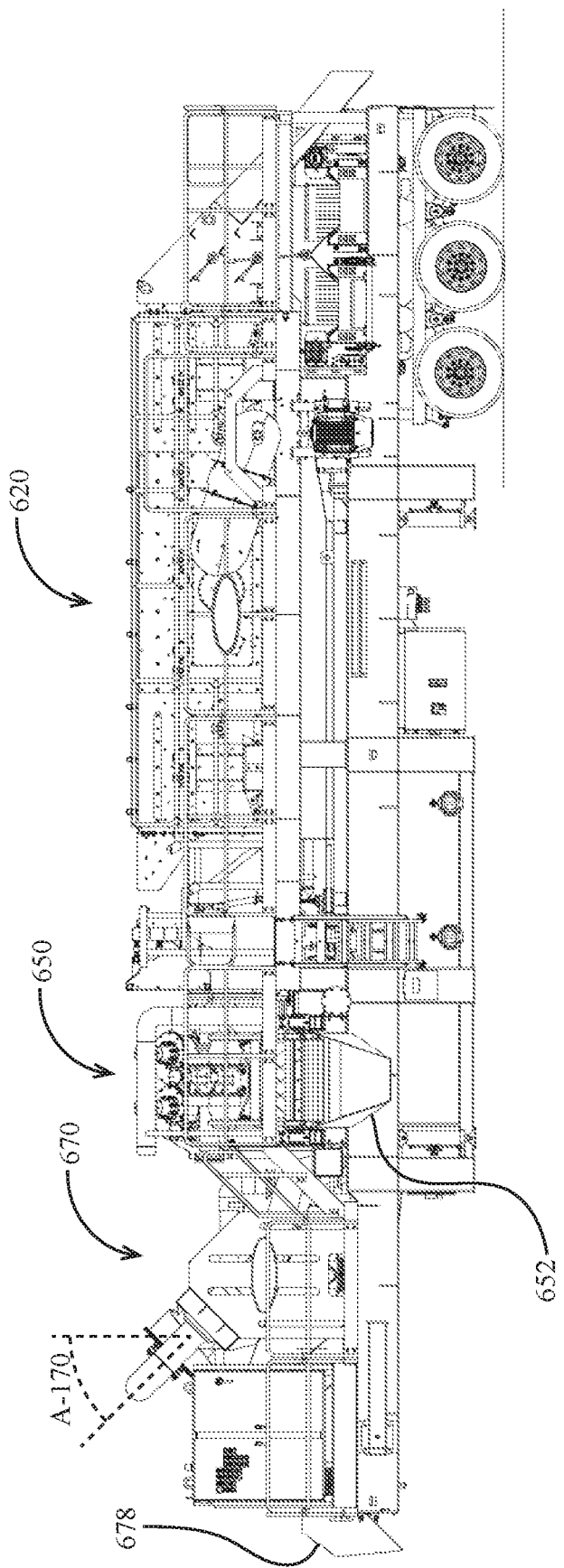
FIG. 9 is a left side elevation view of the embodiment of the aggregate processing plant of FIG. 6.
Figure 10:
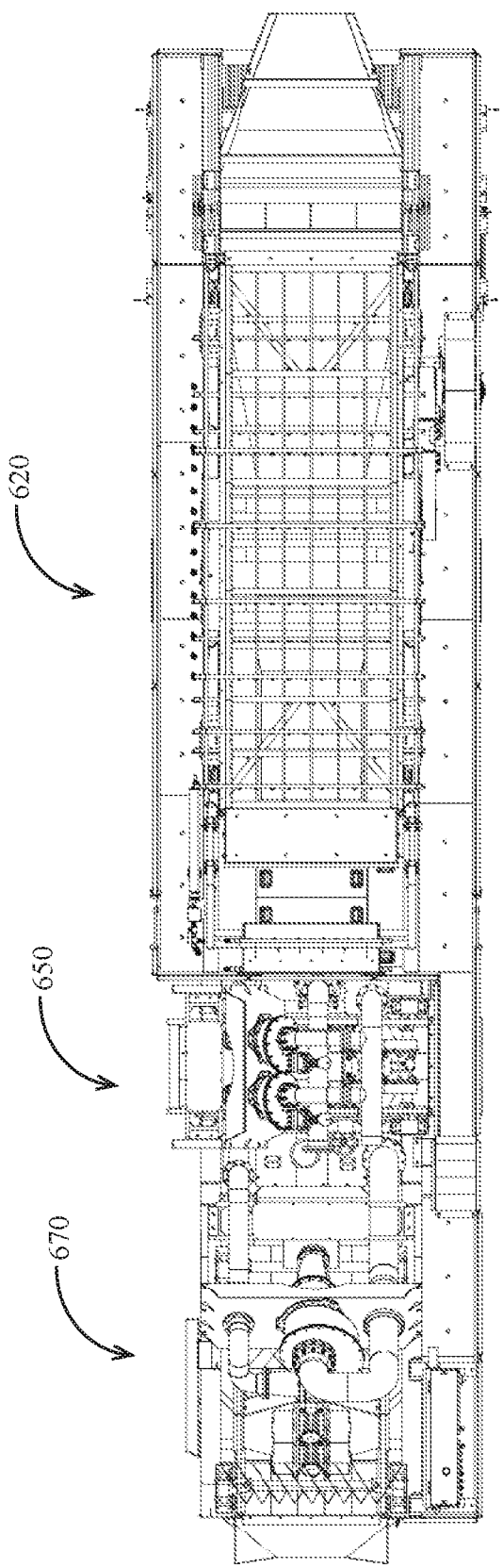
FIG. 10 is a top plan view of the embodiment of the aggregate processing plant of FIG. 6.

Referring to FIGS. 6 and 7, the system 600 optionally includes a classifying screen such as a vibratory screen 620 (e.g., horizontal vibratory screen such as a three-deck screen or four-deck screen). A hopper 610 is optionally disposed to receive aggregate material (e.g., slurry) and transfer the aggregate material on the screen 620 (e.g., on an upper deck thereof). In some embodiments, oversize material passing over individual decks of the screen 620 is directed by a chute assembly 630 (see FIG. 8) to various locations for further processing. The chute assembly 630 optionally directs oversize material from one deck (e.g., the upper deck) to a chute 633 rearward of the plant 60. The chute assembly 630 optionally directs oversize material from another deck (e.g., a middle deck) to a conveyor 634 which optionally transfers material to the side of the plant 60. The chute assembly 630 optionally directs oversize material from another deck (e.g., the bottom deck) to a conveyor 636 which optionally transfers material to the side of the plant 60.

The system 600 optionally includes a hydrocyclone 170 which is optionally disposed at an angle A-170 (see FIG. 9) relative to vertical (e.g., 45 degrees, approximately 45 degrees, between 30 and 60 degrees, etc.). In some embodiments, at least a portion of undersize material passing through screen 620 is moved (e.g., pumped) to a feed inlet of hydrocyclone 170. The system 600 optionally includes a vibratory screen 670 (e.g., dewatering screen) which is optionally disposed to receive material from an outlet (e.g., underflow outlet) of the hydrocyclone 170. In some embodiments, at least a portion of oversize material passing over a screen deck 672 of screen 670 passes off the end of the screen 670 and/or off the end of the plant 60 (e.g., an end of the plant generally opposite the wheels 225 in some embodiments) such as through a chute 678 (see FIG. 9). In some embodiments, the dewatering screen 670 has a conventional classifying deck extending substantially across the width of the dewatering screen and having a single orifice size substantially across the width of the dewatering screen.

In some embodiments, the system 600 includes one or more hydrocyclones 150 (e.g., two hydrocyclones 150a, 150b). The hydrocyclones 150a, 150b are optionally smaller in diameter than the hydrocyclone 170. A central axis of one or more of the hydrocyclones 150 is optionally disposed at an angle A-150 (e.g., 45 degrees, approximately 45 degrees, between 40 and 50 degrees, between 30 and 60 degrees, etc.) with respect to vertical (see FIG. 13C).

The system 600 is optionally configured to transfer at least a portion of material from the discharge (e.g., overflow discharge) of hydrocyclone 170 to a feed inlet of at least one (e.g., both) of the hydrocyclones 150a, 150b; for example, by gravity transfer to a sump from hydrocyclone 170 and then pumping to the hydrocyclones 150a, 150b. The system 600 optionally includes a vibratory screen 650 (e.g., dewatering screen) disposed to receive outlet material (e.g., underflow material) from one or more of the hydrocyclones 150a, 150b. At least a portion of oversize material passing over a deck of screen 650 optionally passes of the side of the plant 60 such as through a chute 652 (see FIG. 9).

Figure 11A:
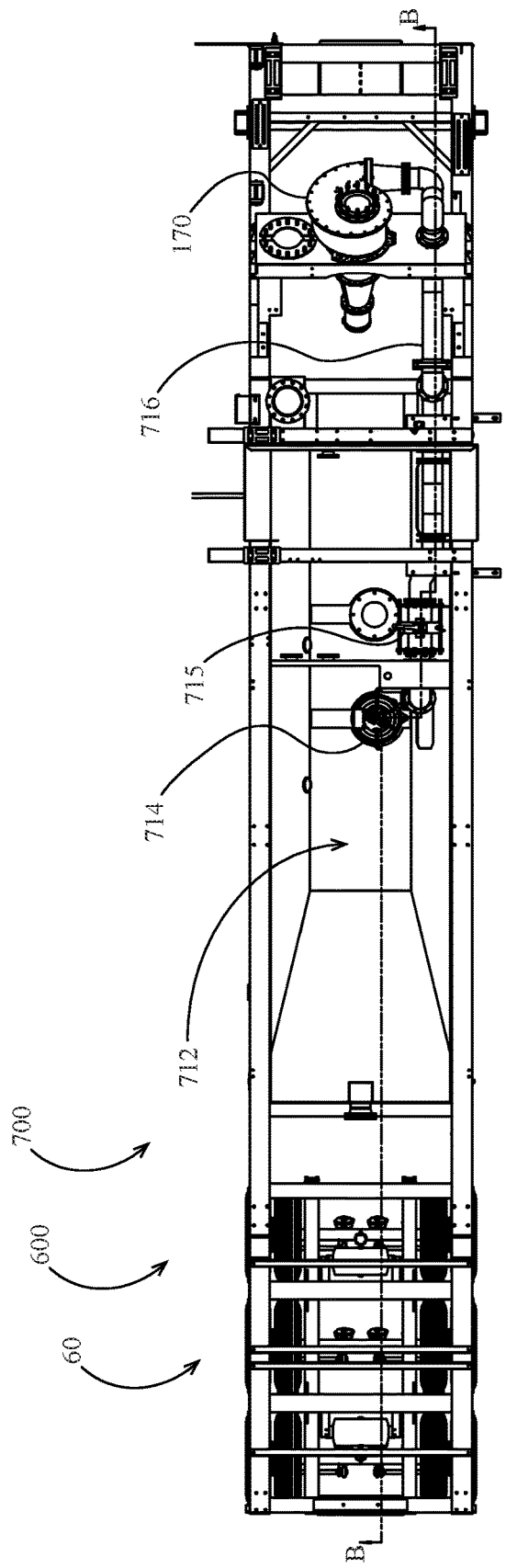
FIG. 11A is a top view of the embodiment of the aggregate processing plant of FIG. 6 with certain components not shown.
Figure 11B:
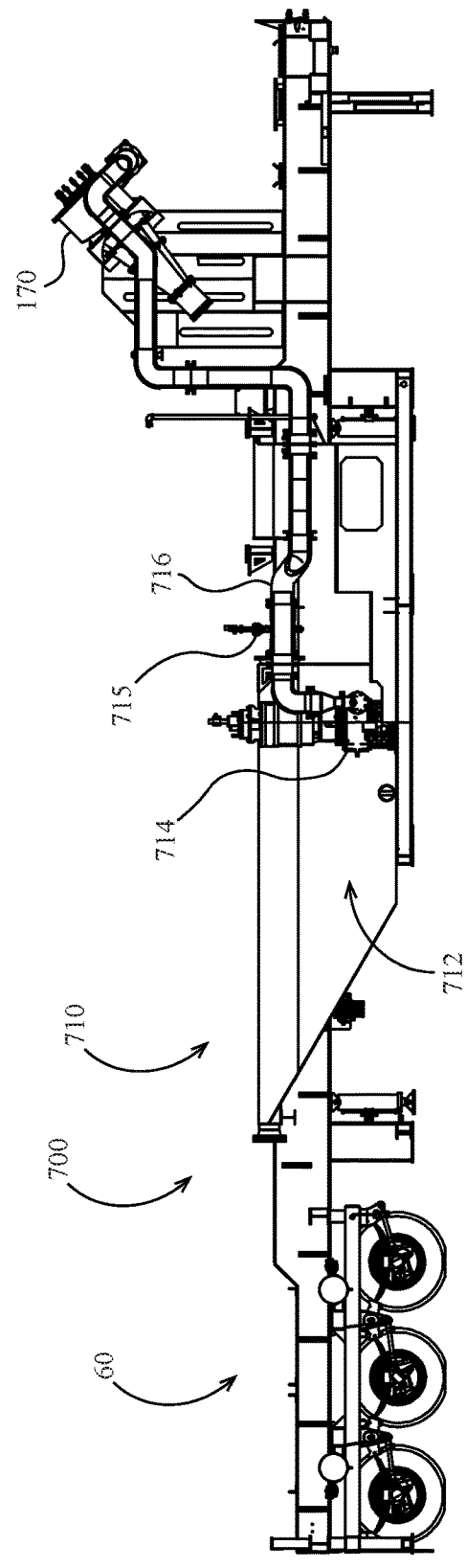
FIG. 11B is a sectional view of the embodiment of the aggregate processing plant as viewed along section B-B of FIG. 11A with certain components not shown.

Referring to FIGS. 11A and 11B, the system 600 optionally includes a material transfer system 700 optionally including a subsystem 710. Subsystem 710 optionally includes a sump 712 disposed to receive undersize material from screen 620. Subsystem 710 optionally includes a pump 714 (e.g., submersible pump) which is optionally disposed in the sump 712 and disposed to pump material from the sump 712. The pump 714 is optionally in fluid communication with hydrocyclone 170, in some embodiments via a conduit 716. A valve 715 is optionally positioned to block or reduce flow through conduit 716.

Referring to FIGS. 12A and 12B, the material transfer system 700 optionally includes a subsystem 720. Subsystem 720 optionally includes a sump 722 disposed to receive discharge (e.g., overflow discharge) from hydrocyclone 170, e.g., via a conduit 724.

Figure 13A:
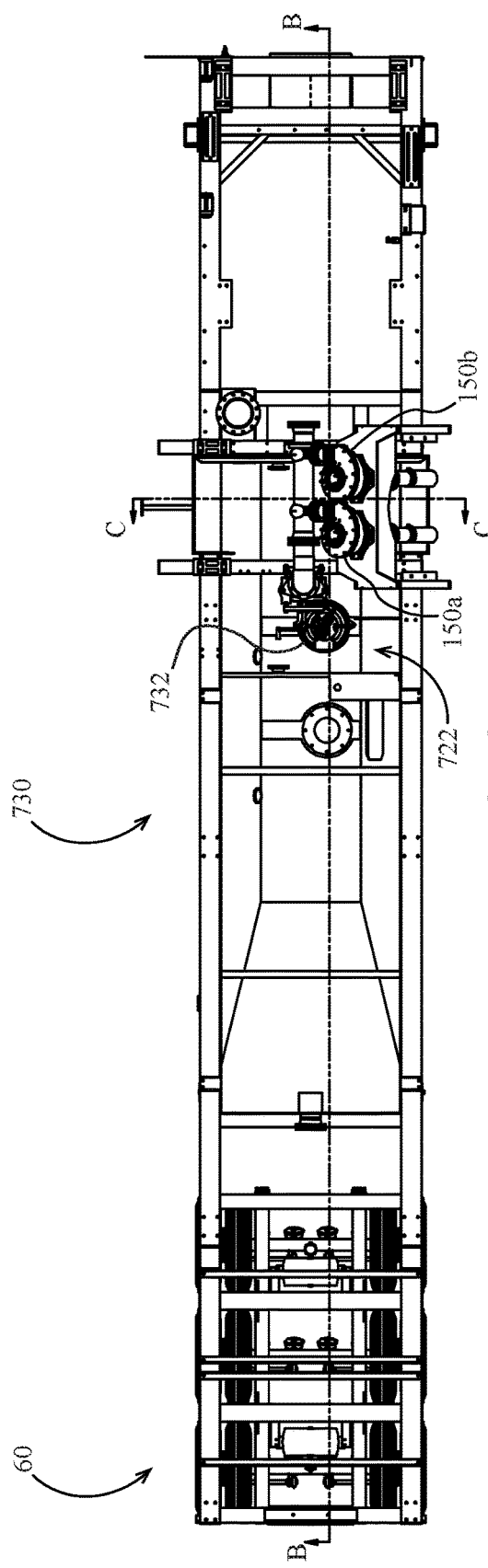
FIG. 13A is another top view of the embodiment of the aggregate processing plant of FIG. 6 with certain components not shown.
Figure 13C:
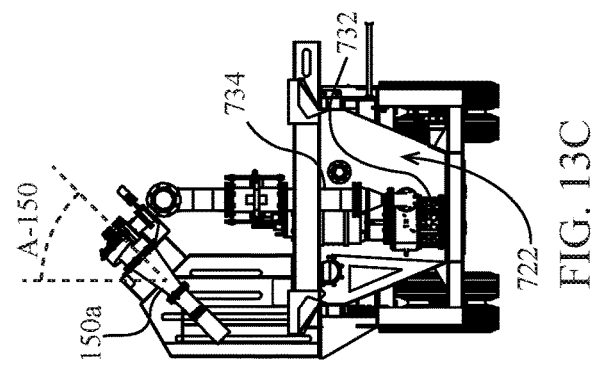
FIG. 13C is a sectional view of the embodiment of the aggregate processing plant as viewed along section C-C of FIG. 13A with certain components not shown.
Figure 13B:
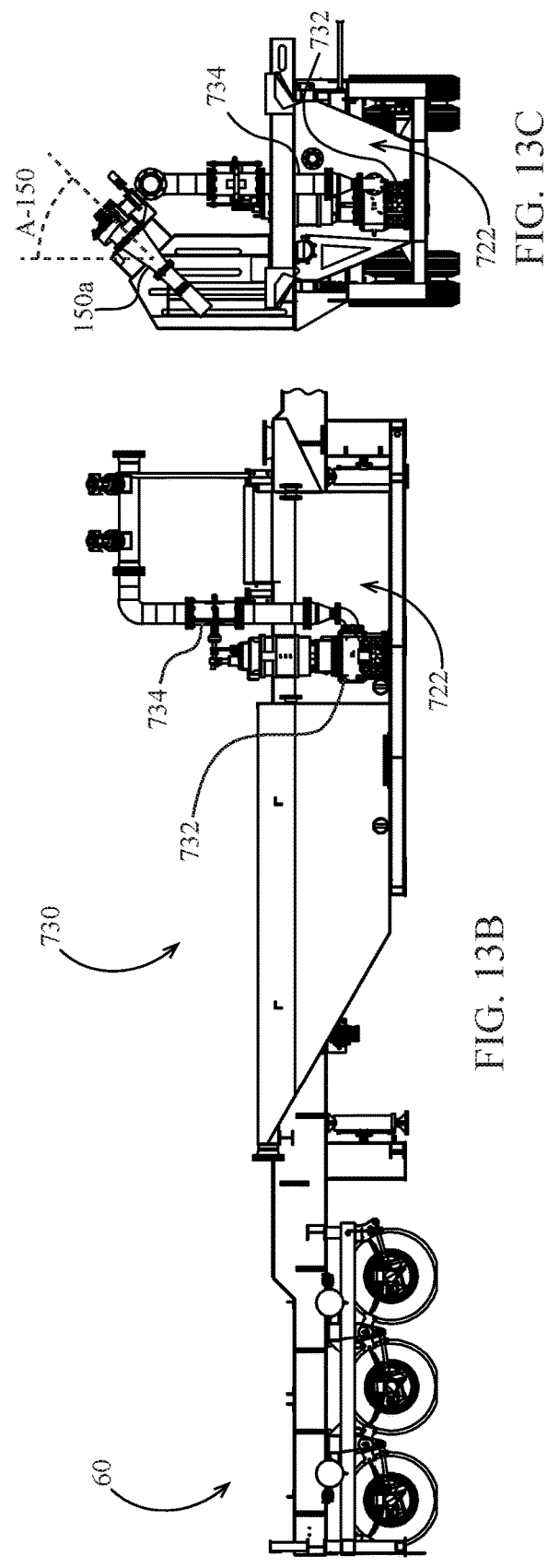
FIG. 13B is a sectional view of the embodiment of the aggregate processing plant as viewed along section B-B of FIG. 13A with certain components not shown.

Referring to FIGS. 13A and 13B, the material transfer system 700 optionally includes a subsystem 730. Subsystem 730 optionally includes a sump 722 disposed to receive undersize material passing through screen 650. Subsystem 730 optionally includes a pump 732 (e.g., submersible pump) optionally disposed inside sump 722 and configured to pump material from sump 722 to the feed inlets of hydrocyclones 150a, 150b, e.g., via a conduit 734. A fines recovery subsystem optionally comprises one, one or more, or all of the following: hydrocyclones 150, dewatering screen 650, pump 732.

Referring to FIGS. 14A and 14B, the material transfer system 700 optionally includes a subsystem 740. Subsystem 740 optionally includes a conduit 742 for directing discharge (e.g., overflow discharge) from the hydrocyclones 150a, 150b to an optional splitter box 744. Splitter box 744 is optionally in fluid communication with one or both of sumps 712, 722 via one or both of conduits 746, 748 respectively. A valve 745 is optionally configured to selectively block or reduce flow via conduit 746. A valve 747 is optionally configured to selectively block or reduce flow via conduit 748.

Referring to FIGS. 15A and 15B, the material transfer system 700 optionally includes a subsystem 750. The subsystem 750 includes a sump 752 disposed to receive undersize material passing through screen deck 672 of screen 670, e.g., via a flume 674. The subsystem 750 optionally includes a pump 754 (e.g. submersible pump) optionally disposed in sump 752 and configured to pump material from the sump 752. The pump 754 is optionally in fluid communication with the sump 712, e.g., via a conduit 756 having an outlet 758.

Figure 16:
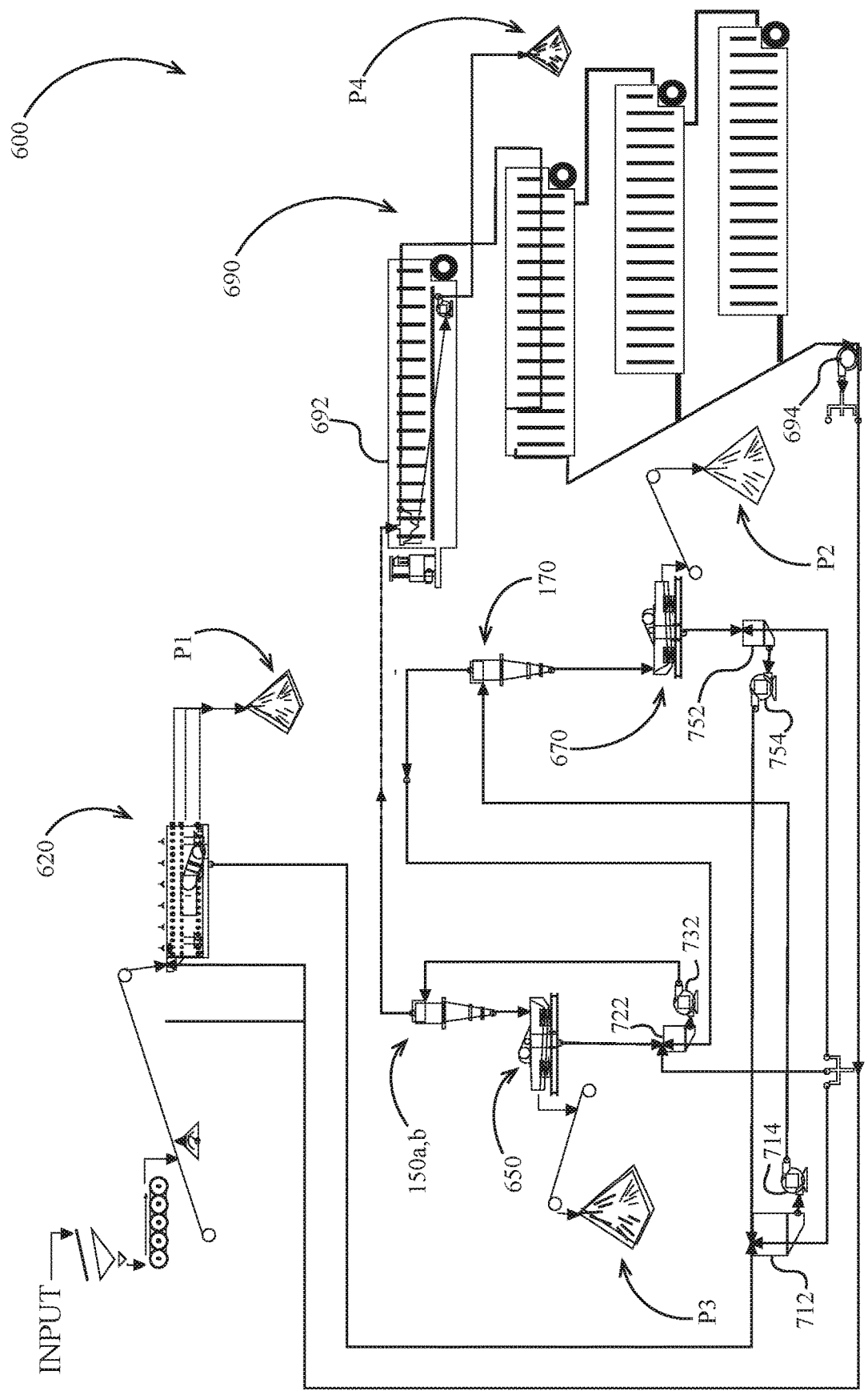
FIG. 16 is a schematic illustration of an embodiment of an aggregate processing system.

Referring to FIG. 16, aggregate processing system 600 is schematically illustrated according to some embodiments. The input material (e.g., slurry, etc.) is optionally conveyed (e.g., after being processed by one or more classifying or washing apparatus) by a conveyor (or other transfer device) to the system 600, which is illustrated schematically in FIG. 16. One or more outputs of the system 600 (e.g., at least a portion of the overflow of one or more hydrocyclones 150 and/or 170) is optionally transferred to a subsystem 690 which may be separate from the plant 60. The subsystem 690 optionally comprises one or more clarifiers 692. A pump 694 optionally pumps material from a settling pond 520 back to one or more inputs of the system 600.

In the aggregate processing system 600 illustrated in FIG. 16, screen 620 optionally produces one or more products P1 passing over the screen decks of screen 620. Screen 670 optionally produces a product P2 passing over the screen deck of screen 670. Screen 650 optionally produces an oversize product P3 passing over the screen deck of screen 650. Screen 650 optionally has a deck of finer (e.g., smaller) classification than the deck of screen 670 such that the product P3 is finer than product P2. In some embodiments, hydrocyclones 150a, 150b are configured to produce a finer underflow than hydrocyclone 170.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A portable aggregate processing plant, comprising:
a portable chassis having a first end a second end, a first lateral side and a second later side, the portable chassis supported on a plurality of wheels;
a vibratory classifier screen supported on said portable chassis, said vibratory classifier screen having a plurality of classifying decks;
a primary sump disposed to receive at least a fraction of undersize material passing through at least one of said plurality of classifying decks;
a primary pump configured to pump material from said sump to an elevated location elevated with respect to said sump;
a primary hydrocyclone having a primary hydrocyclone feed inlet in communication with said primary pump, said primary hydrocyclone having a first underflow having a primary hydrocyclone central axis, said primary hydrocyclone central axis disposed at a non-zero primary hydrocyclone angle with respect to vertical;
a primary dewatering screen, said primary dewatering screen disposed to receive an underflow from said primary hydrocyclone, said primary dewatering screen disposed to deposit oversize material at the second end of the portable chassis;
a fines recovery subsystem supported on said portable chassis and positioned between said vibratory classifier screen and said primary hydrocyclone such that material transferred from said primary sump to said primary hydrocyclone and past said fines recovery subsystem, wherein said fines recovery subsystem comprises:
a first fines recovery subsystem hydrocyclone, and
a fines recovery subsystem vibratory dewatering screen disposed beneath said first fines recovery subsystem hydrocyclone, said fines recovery subsystem vibratory dewatering screen being disposed to receive at least a portion of an underflow of said first fines recovery subsystem hydrocyclone, said fines recovery subsystem vibratory dewatering screen being disposed to discharge oversize material to one of the first and second lateral sides of the portable chassis.

2. The plant of claim 1, wherein the plant has a road-portable height in an operating configuration of the plant.

3. The plant of claim 2, wherein said primary hydrocyclone angle is between 30 and 60 degrees.

4. The plant of claim 1, wherein said primary hydrocyclone angle is 45 degrees.

5. The plant of claim 1, wherein said fines recovery subsystem further comprises:
a fines recovery subsystem sump disposed to receive undersize material and water passing through said fines recovery subsystem vibratory dewatering screen.

6. The plant of claim 5, wherein said fines recovery subsystem sump is disposed to receive at least a portion of an overflow of said primary hydrocyclone.

7. The plant of claim 6, wherein said fines recovery subsystem further comprises:
a submersible fines recovery subsystem pump disposed at least partially within said fines recovery subsystem sump.

8. The plant of claim 7, wherein said first fines recovery subsystem hydrocyclone is disposed at a non-zero angle with respect to vertical.

9. The plant of claim 8, wherein said fines recovery subsystem further comprises:
a second fines recovery subsystem hydrocyclone disposed at a non-zero angle with respect to vertical.

10. The plant of claim 1, wherein said first fines recovery subsystem hydrocyclone is configured to produce a finer underflow than said primary hydrocyclone.

11. The plant of claim 10, wherein said fines recovery subsystem further comprises:
a fines recovery subsystem sump disposed to receive undersize material and water passing through said fines recovery subsystem vibratory dewatering screen; and
a fines recovery subsystem pump, said fines recovery subsystem pump configured to pump material from said fines recovery subsystem sump to a feed inlet of said first fines recovery subsystem hydrocyclone.

12. The plant of claim 1, wherein the plant has a road-portable height in an operating configuration of the plant.

13. A portable aggregate processing plant, comprising:
a portable chassis supported on a plurality of wheels and extending from a first end to a second end;
a vibratory classifier screen supported on said portable chassis, said vibratory classifier screen having a plurality of classifying decks;
a fines recovery subsystem supported on said chassis and disposed at least partially toward said second end from said vibratory classifier screen, said fines recovery subsystem comprising:
at least a first fines recovery subsystem hydrocyclone; and
a fines recovery subsystem vibratory dewatering screen disposed to receive at least a portion of an underflow of said first fines recovery subsystem hydrocyclone, wherein said fines recovery subsystem vibratory dewatering screen is oriented to deposit material to a lateral side of the portable chassis;
a primary sump supported on said portable chassis, said primary sump disposed beneath said vibratory classifier screen, said primary sump disposed to receive at least a fraction of undersize material passing through at least one of said plurality of classifying decks;
a primary pump, said primary pump configured to pump material from said primary sump to an elevated location elevated with respect to said primary sump;
a primary hydrocyclone supported on said chassis and disposed at least partially closer to said second end than said fines recovery subsystem, said primary hydrocyclone having a feed inlet in fluid communication with said primary pump, said primary hydrocyclone having a first underflow having a primary hydrocyclone central axis, and
a primary dewatering screen, said primary dewatering screen disposed to receive material from said first underflow of said primary hydrocyclone, said primary dewatering screen disposed to deposit oversize material at the second end of said chassis.

14. The plant of claim 13, wherein the plant has a road-portable height in an operating configuration of the plant.

15. The plant of claim 14, wherein said primary hydrocyclone central axis is disposed at a non-zero primary hydrocyclone angle with respect to vertical.

16. The plant of claim 13, wherein said primary hydrocyclone central axis is disposed at a non-zero primary hydrocyclone angle with respect to vertical.

17. The plant of claim 16, wherein said primary hydrocyclone angle is between 30 and 60 degrees.

18. The plant of claim 16, wherein said primary hydrocyclone angle is 45 degrees.

19. The plant of claim 13, wherein said first fines recovery subsystem hydrocyclone is configured to produce a finer underflow than said primary hydrocyclone.

\* \* \* \* \*